May 3, 1932. D. D. STARK 1,856,141
METHOD OF TREATING HYDROCARBON OILS
Filed Sept. 22, 1928
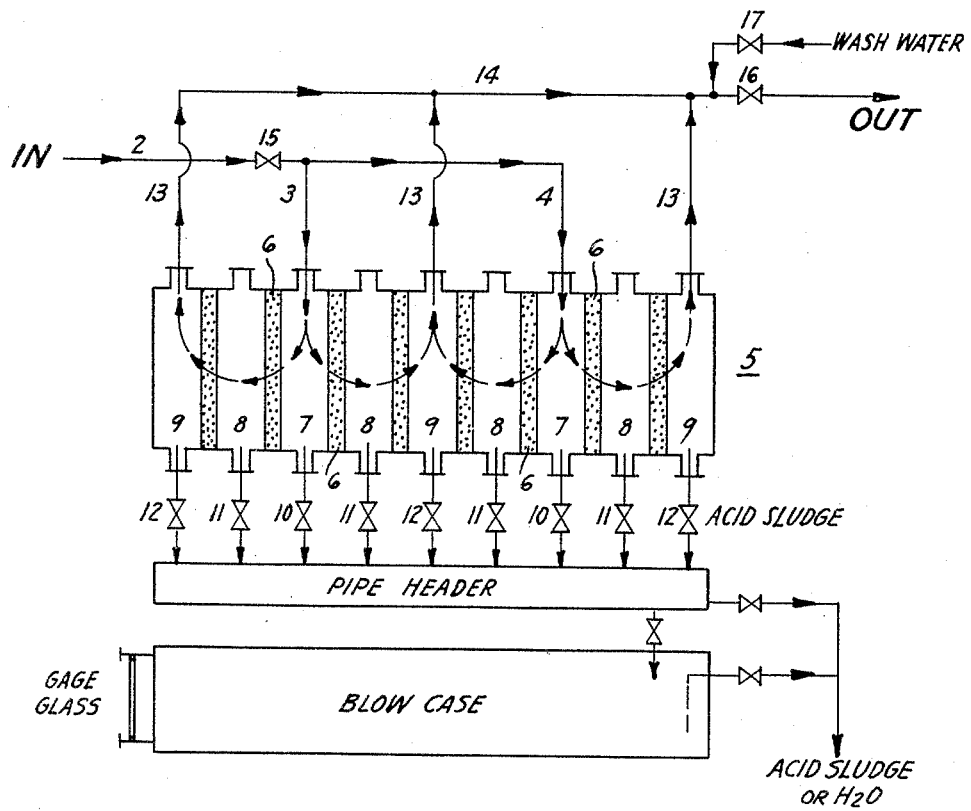
INVENTOR.
DAVID DEWEY STARK.
By Eugene C. Gott, Jr.
Attorney.

Patented May 3, 1932

1,856,141

UNITED STATES PATENT OFFICE

DAVID DEWEY STARK, OF BERKELEY, CALIFORNIA, ASSIGNOR TO ASSOCIATED OIL COMPANY, OF SAN FRANCISCO, CALIFORNIA, A CORPORATION OF CALIFORNIA

METHOD OF TREATING HYDROCARBON OILS

Application filed September 22, 1928. Serial No. 307,754.

This invention relates to the refining of hydrocarbon oils and refers particularly to that class of hydrocarbons which are subjected to acid treatment.

The object of this invention is to subject the acid treated hydrocarbons to a new physical treatment as the means of obtaining an efficient separation of acid from the mixture.

It is well known that in order to get a good chemical reaction between two substances, it is necessary to have an intimate contact between the reacting molecules. Thus in the refining of hydrocarbon oils, it has been found that to efficiently treat the hydrocarbons with acid, the mixture must be subjected to violent agitation. Having accomplished the acid treat under the proper conditions, the next problem and the problem which is solved by this invention is to remove the acid and its contained sludge.

By one method heretofore used such acid treated hydrocarbons have been treated with clay to remove the sludge and neutralize the acid. Sometimes, especially with heavy oils, it is a common practice to "souse" the oil which means coagulating the acid sludge by the addition of water. This sousing of the mixture causes hydrolysis and dilution of the acid, besides evolving considerable heat, which is very detrimental to the final color and chemical characteristics of the oil. This hydrolysis and dilution of the acid sludge allows the material removed or reacted on by the acid to return to the oil in its original form, or in a more active form which will on standing form colored compounds and darken the final color of the finished hydrocarbon.

In getting the intimate contact desired in the acid treat, the treating agent becomes very finely divided, and such a highly dispersed emulsion is formed, that it corresponds to a colloidal suspension. These emulsions have been found to stand for hours without settling out and the longer the acid sludge remains, the greater the secondary reactions which are very detrimental to the color of the finished oil.

It is therefore a further object of this invention to remove the acid sludge from the hydrocarbon mixture as quickly as possible to prevent any further reaction that may effect the color of the product.

The objects of this invention are attained by passing the hydrocarbon mixture thru a fixed section of very fine porous plate or any other similar material which has a very fine but porous and permanent structure. In such a filtration, the coarse particles of sludge, wet the front surface of the plate and tend to collect any sludge with which they come in contact and this collected sludge is usually fluid enough to run down the front surface of the plate where it is drawn off. The very fine sludge particles which pass through the plate are subjected to a squeezing action which brings them into very close contact with each other and to such an extent that the film separating these particles is broken. Thus the finest sludge particles coalesce to form a particle which is heavy enough to settle out immediately or deposit on the succeeding filter plates. It has been found in actual operation that by placing these permanent filter plates in a series of two or more, the sludge is completely removed and only traces of acidity chiefly due to dissolved $SO_2$ remain in the finished hydrocarbon oil.

The accompanying drawing is of a diagrammatic nature, showing the filter in section, and illustrates one combination of apparatus suitable for use in carrying out this process.

In the arrangement of apparatus shown, the hydrocarbon mixture containing the acid sludge is brought through the line 2, and allowed to flow through the lines 3 and 4 to the filter, which is generally designated by the numeral 5. The filter 5 is made up of a series of small chambers, 7, 8, and 9, which are separated by filter plates 6, which, in this instance are of alundum which is well known to consist of electrically fused alumina grains bonded in a kiln with an aluminous glass, the whole comprising an aluminous abrasive, but any other material that will provide the necessary permanent and dense construction may be used. The alundum filter plates used are the product of electrically fusing the mineral bauxite, or crystalline aluminum oxide ($Al_2O_3$), the grains of which are bonded in a kiln with an aluminous glass to form a mass having uniform porosity, or even sized capillary passages uniformly distributed. Such plates are practically unaffected by any acid except hydrofluoric acid or neutral and slightly alkaline liquors, but are dissolved by strong and hot sodium and potassium hydroxides. The hydrocarbon mixture is introduced from lines 3 and 4 into the chambers 7 and may flow through either filter plate to chambers 8. The coarse sludge particles wet filter plates 6 in the chambers 7 and gradually slide to the bottom and are drawn off through the valves 10. In the chambers 8 the finer sludge particles become united and either immediately settle to the bottom or are deposited on the next succeeding filter plate as the mixture passes through to the chambers 9 while the sludge is drawn off through the valves 11. In the chambers 9, the remaining acid particles settle out by gravity to be removed through the valves 12 while the finished hydrocarbon oils containing only traces of acid passes out through the line 13 to the header of 14. To the hydrocarbon oil coming from the filter, it is only necessary to wash with water or add a very small amount of caustic to obtain a neutral product.

After a certain period, usually about every eight hours, it is only natural that there should be an accumulation of sludge on or in the filter plates, and by reason of the permanent structure of these plates, it is possible to subject them to a back-wash, which thoroughly cleanses them and interrupts the operation of the filter for only a few minutes. This step is accomplished in the setup shown by closing the valve 15 to stop the flow of the hydrocarbon mixture and the valve 16 after as much as possible of the finished hydrocarbons have been drawn from the filter. The valve 17 is then opened admitting water through the header of 14, which allows water to be forced through the plate in a reverse direction, thereby opening up the pores of the filter plate which may have become clogged. The wash water may be drawn off through the valves 10 and 11 and 12, and when the backwashing is completed, the valve 17 is closed and the valves 15 and 16 re-opened and the mixtures passes through the filter as before.

This method of removing the acid sludge by filtering and coagulating the acid sludge prevents the hydrolysis and neutralization of the sludge when the oil is thereafter washed and neutralized. The exact chemistry of acid treating is not entirely known, but it is believed that the acid sludge is composed of products of a chemical reaction, as well as a solution of some of the hydrocarbon oils in the acid, and the acid sludge should be completely removed before washing or neutralizing of the oil to get the best results. If the sludge is left in suspension it forms compounds when neutralized or hydrolyzed that are colorless, or nearly so, but are very reactive chemically when exposed to light, giving polymerized products which are pink or yellow, thus causing the products to go off color. By removing all of the acid sludge, the heat of reaction and neutralization in the following treatment is also eliminated and the resulting color and chemical characteristics of the final product are greatly improved.

This process may be used on any hydrocarbon oil that requires acid treatment, and it has been proven and found satisfactory on gasoline, kerosene, petroleum spirits, engine distillate, transformer oil, and cosmetic oil.

While there are other ways of removing acid sludge from hydrocarbon oils, one of the principal advantages of this process is the low initial cost of the necessary equipment compared to the elaborate and bulky equipment necessary to perform the same results on the same hydrocarbon oil by other methods. Also, there is practically no operating or maintenance expense, for if the plates are backwashed periodically, they should function efficiently for an indefinite period.

Of course this process may be made continuous by employing two such filters, which would enable the operator to alternately change the flow of acid treated hydrocarbons in one filter while the other was being subjected to the backwash.

While I have described the preferred means at this time of separating the sludge from the acid treated hydrocarbon oils, it should be understood that the invention is not to be restricted or limited to such particular means, and it is intended to include any process for the separation of acid sludge that may be defined by the hereinafter appended claim, in which the term "sludge" includes sulphonic acids and other reaction products of hydrocarbon compounds and sulphuric acid.

What is claimed is:

A method of filtering sludge from hydrocarbon oils which comprises: forcing a mixture of oil and acid reaction products through an aluminous abrasive filter plate, whereby acid reaction products separate on the filter plate from the oil and are removed therefrom by gravity, forcing a washing medium through the plate in a reverse direction to remove acid reaction products within the filter, thus leaving the filter wet, and forcing further oil and acid reaction products through the plate in the first direction; the major portion of the sludge separating from the oil on the face of the filter opposed to the passage of said mixture.

DAVID DEWEY STARK.